United States Patent [19]

Doull

[11] Patent Number: 4,998,623

[45] Date of Patent: Mar. 12, 1991

[54] MEDICATION DISPENSING PACKAGE

[75] Inventor: Hubert K. Doull, Cedar Rapids, Iowa

[73] Assignee: Omni Medical Systems Inc., Marion, Iowa

[21] Appl. No.: 515,199

[22] Filed: Apr. 27, 1990

[51] Int. Cl.⁵ .................. B65D 83/04; B65D 3/26; B65D 5/54

[52] U.S. Cl. .................. 206/531; 206/532; 206/539; 206/604

[58] Field of Search ............. 206/531, 532, 538, 539, 206/604, 528

[56] References Cited

U.S. PATENT DOCUMENTS

| 3,324,996 | 6/1967 | Jordt | 206/531 |
| 3,387,699 | 6/1968 | Heller | 206/531 |
| 3,429,426 | 2/1969 | Wolf et al. | 206/531 |
| 4,384,649 | 5/1983 | Brodsky | 206/532 |
| 4,511,032 | 4/1985 | Bush | 206/531 X |
| 4,574,954 | 3/1986 | Reid | 206/531 |
| 4,817,819 | 4/1989 | Kelly | 206/531 X |

FOREIGN PATENT DOCUMENTS

| 179743 | 4/1986 | European Pat. Off. | 206/531 |
| 300648 | 10/1954 | Switzerland | 206/539 |

Primary Examiner—William I. Price
Attorney, Agent, or Firm—James C. Nemmers

[57] ABSTRACT

A package providing for controlled and contamination-free dispensing of medication in the form of pills or capsules. The package includes a reusable carrier having multiple, individual pill cavities that lock and seal each pill pocket that is provided by a disposable insert. The carrier has a unique arrangement for automatically sealing the insert around each pill pocket.

8 Claims, 3 Drawing Sheets

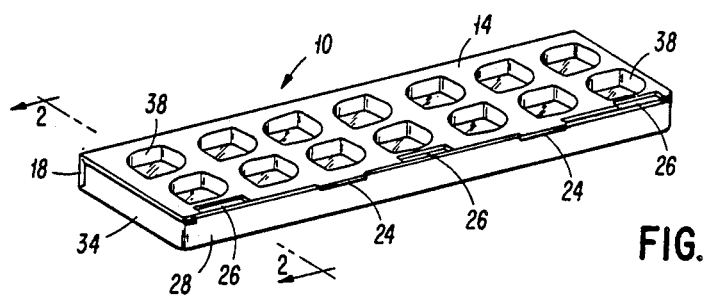
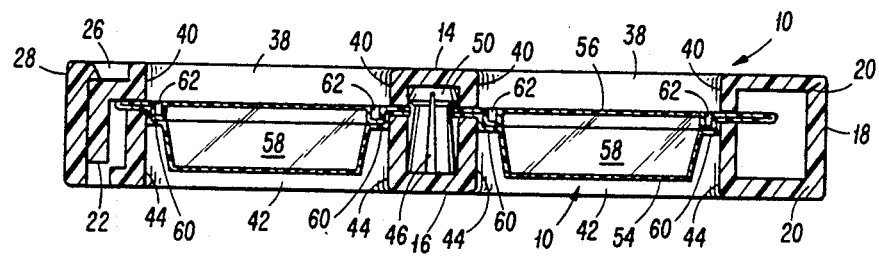
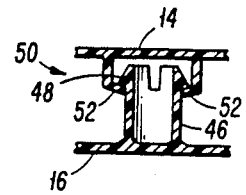
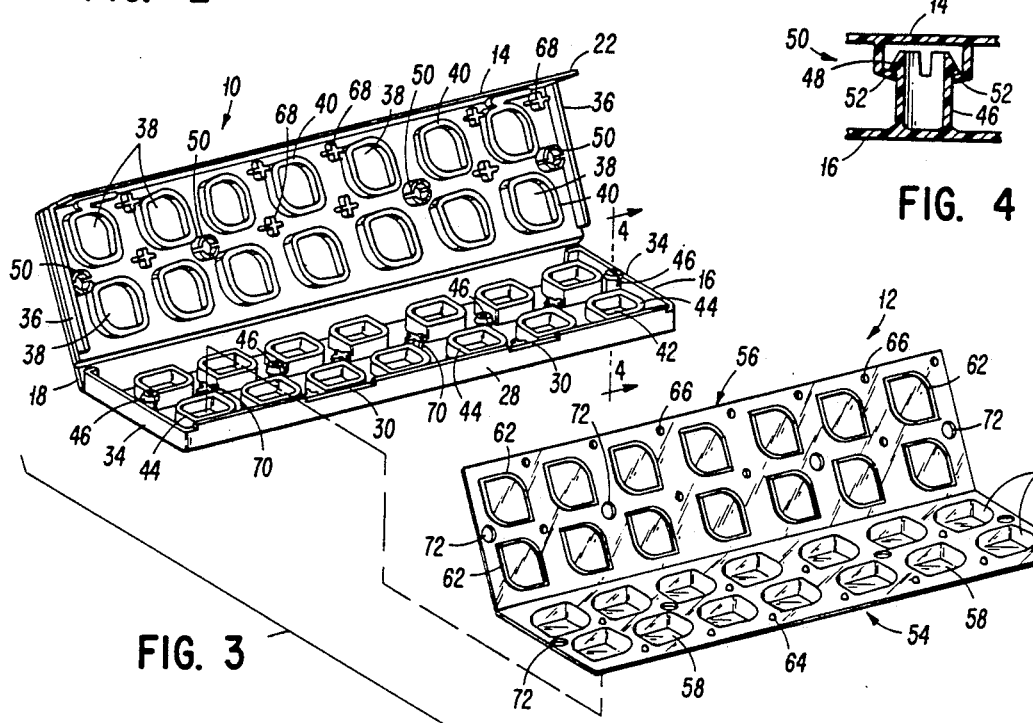

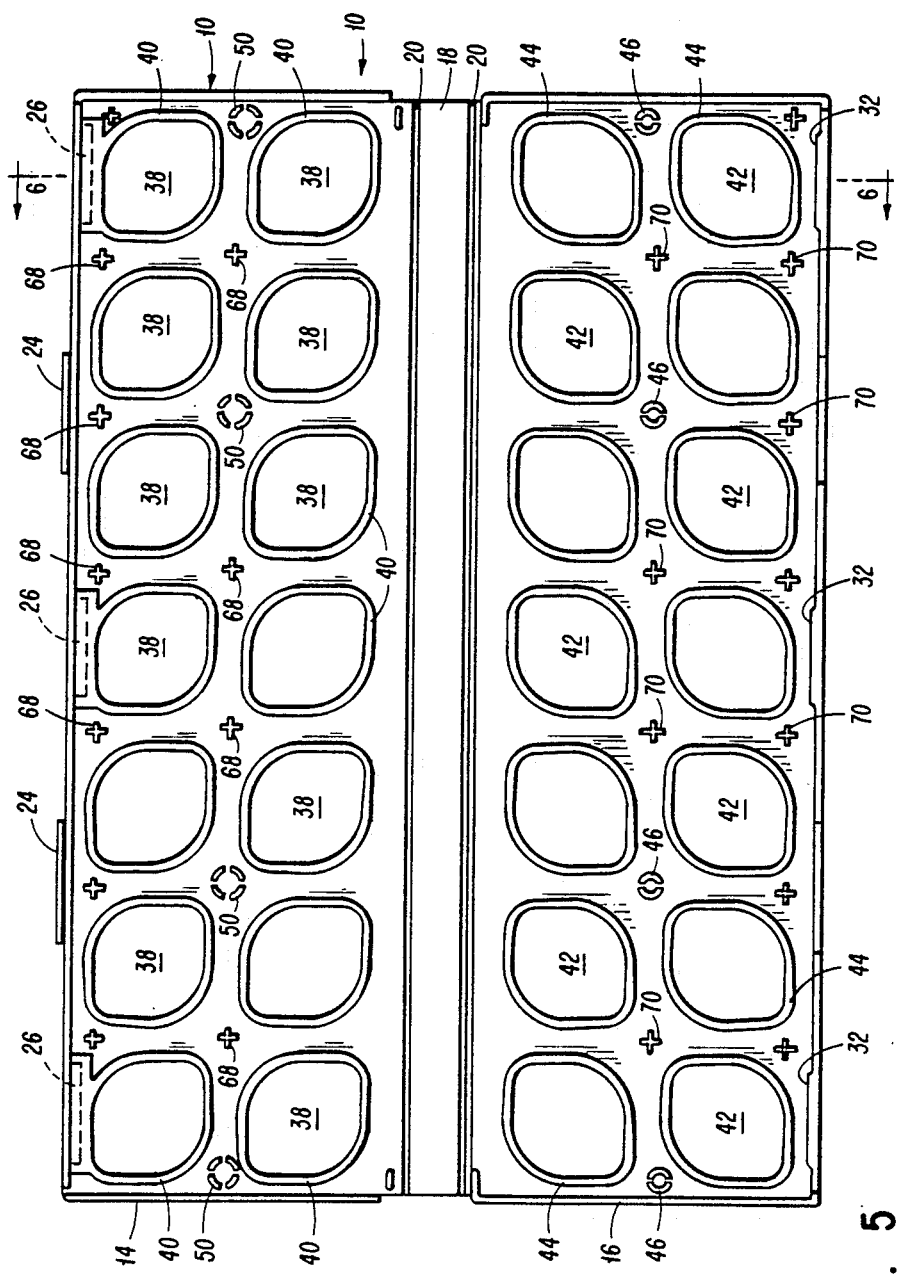
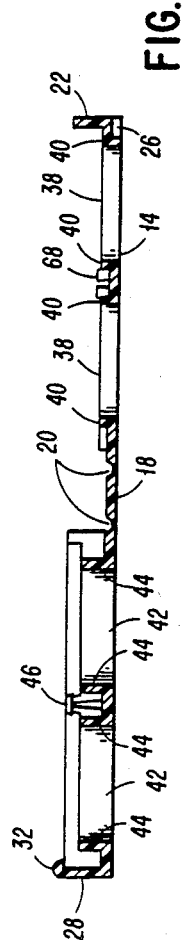

MEDICATION DISPENSING PACKAGE

BACKGROUND OF THE INVENTION

Medication in the form of pills, such as tablets or capsules, is commonly dispensed in hospitals and other care facilities using packages that contain individual compartments, each of which holds a single dose of the medication. Such packages allow medication to be dispensed according to a predetermined system or cycle to assure that the proper dosage is dispensed on each day. For example, such packages are commonly marketed with fourteen individual compartments or pockets which will supply one week's medication that is to be dispensed twice daily. Such packages thus minimize the possibility of the patient receiving an incorrect dosage of a prescribed medication.

To accomplish the above, these medication dispensing packages utilize a reusable carrier and a disposable blister. The disposable blister is formed of a transparent plastic material which provides the individual pockets for the medication. The pharmacist thus fills the blister by placing the appropriate tablet or capsule in each of the pockets, and the blister is then placed in the carrier which contains a corresponding number of cavities. When the carrier is closed, each pocket containing a unit dose of medication is sealed and the medication is visible. When the medication is to be dispensed, the pocket is broken open and the medication removed and given to the patient. When all of the medication in the carrier is dispensed, the carrier is opened, the blister thrown away and a new blister containing medication is placed in the carrier.

Carriers presently used attempt to provide a complete seal around each pocket to prevent moisture from entering the pocket and also to prevent any contaminants from entering as well. Because of their design, some carriers do not provide an adequate seal so that moisture can enter the pocket. Also, some prior art dispensers do not provide adequate security in that it is possible to open the carrier and gain access to a pocket and remove the medication without leaving any evidence of tampering of the package. Also, many of the prior art devices are limited in use in that they cannot handle some of the larger capsules. There is therefore a need for an improved package and blister combination which will handle both tablets and capsules of all sizes, which provides for complete sealing around each pill pocket so as to provide a moisture barrier, and also to provide a package that is easy to use when the medication is to be dispensed.

SUMMARY OF THE INVENTION

The dispensing package of the invention provides a unique sealing construction in which a complete seal of the blister around each pill pocket is assured. The seal is formed because of an indentation or groove formed around each pocket of the blister, which indentation or groove corresponds to a rim formed in the cover portion of the blister, the rim being forced into the indentation by the carrier when the carrier is closed with the blister in place. Pre-machined cuts are formed around the sealed portion of each pocket to facilitate removal of the medication while preserving the integrity of the seal. Also, the two halves of the blister, the pocket portion and the cover, are formed with multiple corresponding locking means that are compressed by the carrier when the carrier is closed to lock the cover on the blister. This assures that the unit cannot be tampered with, and if it is, evidence of the tampering will be clearly visible. Also, the pill pockets are non-circular in shape so as to provide a long diameter for each pocket that will accommodate large capsules.

BRIEF DESCRIPTION OF THE DRAWINGS

FIG. 1 is a perspective view of a dispensing package constructed according to the principles of the invention;

FIG. 2 is a sectional view of the dispensing package taken on the 2—2 of FIG. 1;

FIG. 3 is a perspective view of the carrier and blister showing them separated with their covers open;

FIG. 4 is a sectional view taken on the line 4—4 of FIG. 3 to show one of the carrier locks;

FIG. 5 is a plan view of the carrier in its open position;

FIG. 6 is a sectional view taken on the line 6—6 of FIG. 5;

DESCRIPTION OF THE PREFERRED EMBODIMENT OF THE INVENTION

Figure 7:
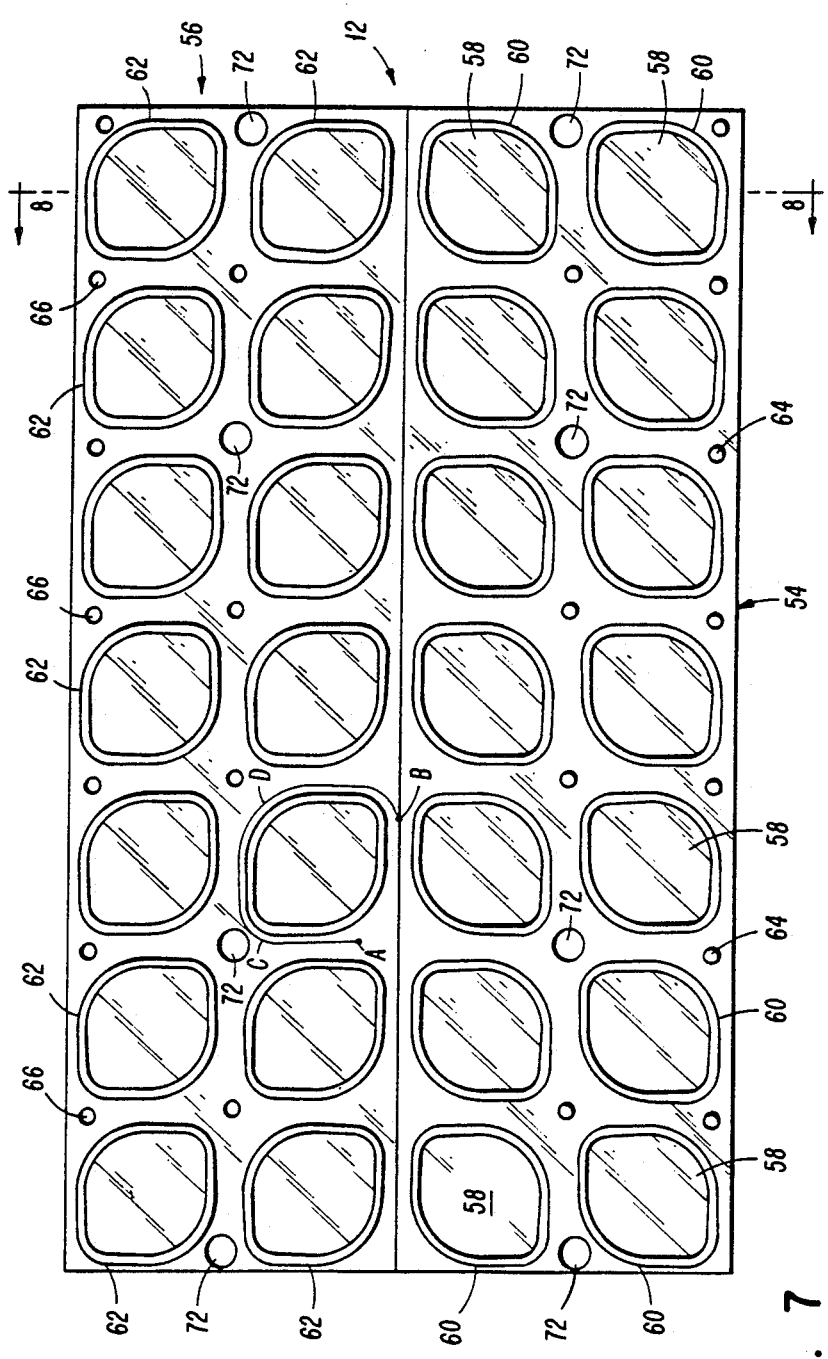
FIG. 7 is a plan view of the blister in an open position.

In FIG. 1, there is illustrated a medication dispenser constructed according to the principles of the invention. FIG. 1, and the sectional view of FIG. 2, show the dispenser carrier, indicated generally by the reference numeral 10, closed with the insert 12 contained by the carrier 10. The insert 12 is commonly referred to as a "blister pack" and for purposes of description hereinafter, insert 12 will be referred to simply as the "blister" 12.

The carrier 10 has a top portion 14 and a bottom portion 16 which are joined by a double-hinged edge 18. Preferably, the carrier 10 is constructed of a suitable plastic material so that it can be molded in a single piece and repeatedly reused. A suitable plastic material should therefore be sturdy and lightweight, and also be suitable so that when molded, the plastic itself will provide the hinges 20 (FIG. 2) that join the edge 18 to the top portion 14 and the bottom portion 16 of carrier 10.

The top portion 14 of carrier 10 has formed along its downwardly extending front edge 22 two or more outwardly extending lips 24 and several inwardly extending recesses 26 that alternate with the lips 24. The recesses 26 and lips 24 provide one part of a locking means in combination with portions of the bottom portion 16 that securely lock the portions 14 and 16 of carrier 10 when it is closed in the manner described hereinafter.

The bottom portion 16 has an upwardly extending front edge 28 that has a pair of cutout portions 30 that correspond to the lips 24 of the top portion 14. Also, the front edge 28 of bottom portion 16 has a plurality of inwardly extending lugs 32 that correspond in position to the recesses 26 of the top portion 14. Thus, when the top portion 14 is closed onto the bottom portion 16, the lugs 32 will engage in the recesses 26 while the lips 24 will extend into the cutout portions 30. This arrangement provides for a simple locking arrangement to help keep the carrier 10 closed when desired. The lips 24 extend slightly outwardly beyond the front edge 28 of the bottom portion 16 to allow the user to more easily re-open the carrier 10 when desired.

The bottom portion 16 of carrier 10 also has upwardly extending end edges 34 while the top portion 14 has downwardly extending members 36 that are spaced inwardly from the ends of the top portion 14 so as to fit inside of the end edges 34 when the top portion 14 is closed onto the bottom portion 16.

The top portion 14 carrier 10 has a plurality of openings 38 which are aligned in two rows of seven openings each. The number of openings 38 and their specific arrangement depends upon the particular intervals of the medication dosage to be taken by the patient, seven openings being common to correspond to the seven days in a week. The openings 38 are preferably somewhat elliptical in shape, and each opening 38 has a downwardly extending rim 40 around it. Similarly, the bottom portion 16 carrier 10 has a plurality of openings 42 which are also aligned in two rows of seven openings each, with each opening 42 being somewhat elliptical in shape similar to openings 38. Each opening 42 also has an upwardly extending rim 44 around it which rims 44 are substantially higher than the rims 40. The position of the openings 38 and 42 in their respective portions 14 and 16 as well as the rims 40 and rims 44 are sized and positioned so that when the top portion 14 is closed onto the bottom portion 16, the edges of rims 40 will be in alignment with the edges of rims 44, as best seen in FIG. 2.

To positively lock the top portion 14 of carrier 10 when it is closed onto bottom portion 16, the bottom portion 16 has a plurality of upwardly extending locking posts 46 positioned generally along the center of the bottom portion 16 between the openings 42. As best seen in FIG. 4, each such locking post 46 has an outwardly extending lip 48 that will engage with corresponding locking members 50 formed with and extending downwardly from the top portion 14 carrier 10. As best seen in FIGS. 3, 4, 5 and 6, the lips 48 of the locking posts 46 are split across a diameter as are the locking members 50. Each locking member 50 has an inwardly extending lip 52 so that when the top portion 14 is closed onto the bottom portion 16 and force is applied in the area of the locking members 50, the locking members 50 will snap onto and grip the locking posts 46 holding the top portion 14 closed onto the bottom portion 16 until sufficient force is applied to release the locking members 50 from the locking posts 46.

Figure 8:
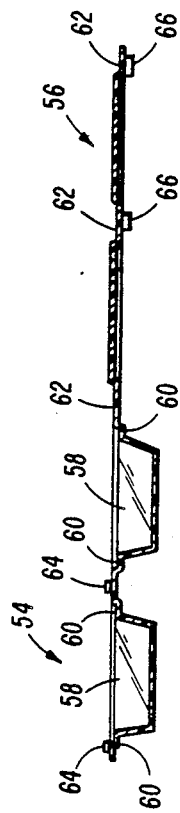
FIG. 8 is a sectional view taken on the line 8—8 of FIG. 7.

From the foregoing description of the carrier 10, it will be seen that the carrier 10 provides a reusable means that can be closed, locked and re-opened for reuse. When used in combination with the blister 12, which is disposable, the combination provides a system for dispensing medication. To achieve this purpose, the blister 12 of the invention is formed from a thin, transparent plastic material and has a bottom portion indicated generally by the reference numeral 54 joined to a cover indicated generally by the reference numeral 56. The bottom portion 54 and cover 56 are hinged together along one edge by being formed from a single piece of material. The bottom portion 54 has formed in it a plurality of pockets 58 of the same configuration as the openings 42 of carrier 10, the size of the pockets 58 being just slightly smaller than the openings 42 so that the pockets 58 will nest inside of the openings 42 of carrier 10. Also, the depth of each pocket 58 in the blister 12 is slightly less than the height of the rims 44 of the bottom portion 16 of carrier 10. As best seen in FIGS. 7 and 8, each pocket 58 has formed completely around it a stepped-down portion that forms an indentation or groove 60. Although an indentation 60 is shown, an actual groove may be used and is preferred in some applications and uses where an air-tight seal is necessary around each pocket 58. It is difficult to provide an air-tight seal with the simpler-to-form indentation, but use of a groove corresponding to the shape of the rim 62 in the cover portion 56 of the blister 12 will assure an air-tight seal.

As indicated, the cover 56 of blister 12 has formed in it a plurality of downwardly extending "O-rings" or rims 62 which correspond in position and shape to the grooves 60 in the bottom portion 54 so that the rims 62 will fit inside of the grooves 60 when the cover 56 is closed over the bottom portion 54 to thereby provide a seal around each pocket 58. As best seen in FIG. 2, the groove 60 of each pocket 58 extends around and over the top edge of the rim 44 when the pocket 58 is seated in an opening 42. Thus, when the blister 12 is placed inside of the carrier 10, pockets 58 will be seated in the openings 42, and when the top portion 14 of the carrier 10 is closed, thereby closing the cover 56 of blister 12, all of the rims 62 of blister 12 will be seated in the grooves 60, and rims 62 and grooves 60 will be squeezed between the edges of the rims 40 of the top portion 14 of carrier 10 and the rims 44 in the bottom portion 16 of carrier 10. When the top portion 14 is locked onto the bottom portion 16 of carrier 10, and the locking members 50 are locked in place on the locking posts 46, the rims 44 and 40 will squeeze the rims 62 of the blister 12 into the grooves 60 and provide a tight seal and moisture barrier around each pocket 58. The structure of the invention also provides for an air-tight seal around each pocket if the components of the dispenser are properly designed and manufactured within required tolerances.

For a purpose which will be evident from the description hereinafter, machined cuts are made in the blister 12 outside of each rim 62, which cuts do not extend completely around the rims 62. As illustrated in FIG. 7 around one of the rims 62, the cut extends from approximately point "A" around (clockwise in FIG. 7) to point "B", except that at points "C" and "D", the cut is interrupted so that the area of the blister inside the rim 62 and around it remains a part of the blister 12. However, since each of these cuts around a rim 62 extends completely through the cover 56 of blister 12, when pressure is applied to the blister in the area over a pocket 58, this will break the connects at points "C" and "D" and allow the contents of the pocket 58 to be easily removed.

To assure that the blister 12, once sealed in the manner just described is not tampered with, or if it is, evidence of tampering will be clearly visible, the bottom portion 54 of blister 12 is provided with a plurality of upwardly extending locking posts 64, while the cover 56 of blister 12 is provided with a plurality of corresponding locking caps 66. Each locking post 64 will fit tightly into a corresponding locking cap 66, and when sufficient force is applied, the locking posts 64 and 66 will be locked together. Because of the number of these locks provided, it is virtually impossible to separate the cover 56 from the bottom portion 54 of the blister 12 once they are locked together. In order to apply the necessary force to lock together the locking posts 64 and locking caps 66 of the blister 12, the top portion 14 of carrier 10 has a plurality of cross-shaped projections 68 while the bottom portion 16 has a plurality of corresponding cross-shaped projections 70. Projections 68 and 70 are positioned in the carrier 10 so that when the blister 12 is placed inside of carrier 10, and projections 68 and 70 will be in precise alignment a locking post 64 and a locking cap 66 squeezing them together and thus performing the locking function. To facilitate locking, the bottom portion 54 and cover 56 of blister 12 each contains cutout openings 72 through which the locking posts 46 and locking members 50 extend when the blister 12 is placed inside of the carrier 10.

Although not shown in the drawings, it is well known in the industry that medication dispensers of this type frequently utilize an insert made of a thin metal foil material that is positioned between the blister 12 and the carrier 10. In some instances, the cover portion 56 of the blister 12 is made of metal foil rather than thin formable plastic. In either event, the thin foil, when used, aids in providing an air tight seal around the medication pockets of the disposable blister.

Since the use of the invention is for controlled dispensing of medication, the use of the dispenser should be evident from the foregoing description. However, its use is summarized as follows. Pills containing the prescribed medication, either capsules or tablets, are placed in the pockets 58. The elliptical shape of the pockets 58, accommodate even the largest of capsules. The person dispensing the medication, commonly a registered pharmacist, will then place the blister 12 containing the medication inside of an opened carrier 10. The top portion 14 of carrier 10 is then closed downwardly onto the bottom portion 16 of the carrier 10. When this occurs, the cover 56 will also be closed onto the bottom portion 54 of the blister 12. As the top portion 14 of the carrier is closed, and sufficient force applied to the areas above the locking members 50, the locking members 50 will snap in place over the locking posts 46. When the top portion 14 is properly locked to the bottom portion 16 of the carrier 10, the rims 40 of the top portion 14 will press downwardly against the rims 44 of the bottom portion 16 and seal the rims 62 in the cover 56 of the blister 12 into the grooves 60 in the bottom portion 54 of the blister 12. This will provide an excellent seal around each of the pockets 58 sufficient to prevent the entry of moisture into the pockets 58. When it is desired to dispense a pill from a single pocket 58, the user will place a finger into the opening 42 containing the pill to be dispensed and press against the bottom of the pocket 58 until the cuts around the rim 62 in the cover 56 of blister 12 tear loose at connecting points "C" and "D" and open the pocket. When all the pills have been dispensed, the top portion 14 of the carrier 10 is opened by gripping the lips 24. The blister 12 can then be removed and thrown away and replaced with another blister containing the desired medication.

It will be evident from the foregoing description that the invention provides an easy-to-use medication dispenser and system. As is known to those in the industry, labeling and color coding are used for identification and for directions in dispensing the medication. The dispenser of the invention, however, provides a tamper-proof disposable blister with an automatic moisture barrier seal being created around each pocket as the carrier is closed over the blister. Each individual medication is easy to dispense by the use of finger pressure. By providing a complete seal around each medication pocket, the medication will remain clean, contamination free and free from moisture. This is all accomplished with a reusable carrier and a disposable blister that are each relatively inexpensive and very easy to use together.

Having thus described the invention in connection with the preferred embodiment thereof, it will be evident to those skilled in the art that various revisions and modifications can be made to the preferred embodiment described herein without departing from the spirit and scope of the invention. It is my intention, however, that all such revisions and modifications as are obvious to those skilled in the art will be included within the scope of the following claims.

What is claimed is as follows:

1. A dispenser for storing and dispensing medication in the form of pills such as tablets or capsules, said dispenser comprising a carrier having a top portion and a bottom portion adapted to be engageable with the top portion when the carrier is closed, the top portion having a plurality of openings, an inwardly extending rim around each such opening, the bottom portion having a plurality of openings corresponding in size, number and position to the openings in the top portion, an inwardly extending rim around each of the openings in the bottom portion, the rims around the openings in the top portion being positioned so as to be in alignment with the corresponding rims around the openings in the bottom portion when the top portion is closed onto the bottom portion, a disposable blister having a top portion and a bottom portion, a plurality of pockets for receiving pills in the bottom portion of the blister, each of the pockets corresponding in approximate size, number and position to the openings in the bottom portion of the carrier so that the bottom portion of the blister can be inserted into the carrier with the pockets seated in the openings in the bottom portion of the carrier, each of the pockets being surrounded by an indentation, and a plurality of downwardly extending rims formed in the top portion of the blister which rims correspond in position and shape to the indentations around the pockets in the bottom portion of the blister, portions of the blister around and outside each rim having cuts extending through the blister, the rims in the top and bottom portions of the carrier being engageable with the rims and indentations in the blister when the blister is inserted in the carrier so as to force the rims in the top portion of the blister into the indentations when the carrier is closed to thereby form a seal over and around each of the pockets, the cuts in the top portion of the blister around each of the rims providing for removal of the pill from the pocket.

2. The dispenser of claim 1 in which the top portion and the bottom portion of the carrier are hingedly connected.

3. The dispenser of claim 2 in which the top portion and the bottom portion of the blister are hingedly connected.

4. The dispenser of claim 1 in which one portion of the blister is provided with a plurality of locking posts and the other portion is provided with a plurality of corresponding locking caps, the posts and caps being positioned so as to be engageable when the carrier is closed, and the carrier is provided with inwardly extending projections positioned to engage the posts and caps when the carrier is closed so as to force the caps and posts together to lock together the upper and lower portions of the blister.

5. The dispenser of claim 1 in which a releasable closure means is provided on the top and bottom portions of the carrier to hold the carrier in a closed position.

6. The medication dispenser of claims 1, 2, 3 4 or 5 in which the shape of the openings in the carrier and the pockets in the blister are somewhat elliptical.

7. A disposable blister for use in combination with a reusable carrier of a medication dispenser for storing and dispensing medication such as pills and capsules and the like, said blister comprising a top portion and a bottom portion each made of thin deformable material, a plurality of pockets for receiving pills formed in the bottom portion of the blister, each of the pockets being surrounded by an indentation, and a plurality of downwardly extending rims formed in the top portion of the blister which rims correspond in position and shape to the indentations around the pockets in the bottom portion of the blister so as to be engageable with the indentations to form a seal around each of the pockets when so engaged, portions of the blister around and outside each rim having cuts extending through the blister.

8. The blister of claim 7 in which one portion of the blister is provided with a plurality of locking posts and the other portion is provided with a plurality of corresponding locking caps, the posts and caps being positioned so as to be engageable when the carrier is closed so as to lock the blister together.

* * * * *